(12) United States Patent
Choi et al.

(10) Patent No.: US 10,351,659 B2
(45) Date of Patent: Jul. 16, 2019

(54) POLYURETHANE FOAM, REFRIGERATOR INCLUDING THE SAME, AND METHOD OF MANUFACTURING POLYURETHANE FOAM

(71) Applicant: Samsung Electronics Co., Ltd., Suwon-si (KR)

(72) Inventors: Jong Ryul Choi, Yongin-si (KR); In Yeol Kim, Suwon-si (KR); Jae-Kyum Kim, Hwaseong-si (KR); Won Jang, Suwon-si (KR); Young Sung Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 103 days.

(21) Appl. No.: 15/378,666

(22) Filed: Dec. 14, 2016

(65) Prior Publication Data

US 2017/0166682 A1    Jun. 15, 2017

(30) Foreign Application Priority Data

Dec. 14, 2015    (KR) .................. 10-2015-0177888

(51) Int. Cl.

| | | |
|---|---|---|
| *C08G 18/64* | (2006.01) | |
| *C08G 18/08* | (2006.01) | |
| *C08G 18/76* | (2006.01) | |
| *C08J 9/12* | (2006.01) | |
| *C08J 9/14* | (2006.01) | |
| *C09K 5/14* | (2006.01) | |
| *F25D 11/02* | (2006.01) | |
| *F25D 23/02* | (2006.01) | |
| *F25D 23/06* | (2006.01) | |
| *C08G 18/65* | (2006.01) | |
| *C08J 9/00* | (2006.01) | |
| C08G 101/00 | (2006.01) | |

(52) U.S. Cl.
CPC ......... *C08G 18/6484* (2013.01); *C08G 18/14* (2013.01); *C08G 18/6492* (2013.01); *C08G 18/6511* (2013.01); *C08G 18/7664* (2013.01); *C08J 9/0061* (2013.01); *C08J 9/0076* (2013.01); *C08J 9/0085* (2013.01); *C08J 9/125* (2013.01); *C08J 9/127* (2013.01); *C08J 9/141* (2013.01); *C08J 9/149* (2013.01); *C09K 5/14* (2013.01); *F25D 11/02* (2013.01); *F25D 23/02* (2013.01); *F25D 23/062* (2013.01); C08G 2101/005 (2013.01); C08G 2105/02 (2013.01); *C08J 2203/10* (2013.01); *C08J 2203/14* (2013.01); *C08J 2203/142* (2013.01); *C08J 2203/182* (2013.01); *C08J 2375/04* (2013.01); *C08J 2401/00* (2013.01); *F25D 2201/126* (2013.01)

(58) Field of Classification Search
CPC ................ C08G 18/14; C08G 18/6484; C08G 18/6492; C08G 18/6511; C08G 18/7664; C08G 2101/005; C08G 2105/02; C08J 9/0061; C08J 9/0076; C08J 9/0085; C08J 9/125; C08J 9/127; C08J 9/141; C08J 9/149; C08J 2203/10; C08J 2203/14; C08J 2203/142; C08J 2203/182; C08J 2375/04; C08J 2401/00; C09K 5/14; F25D 11/02; F25D 23/02; F25D 23/062; F25D 2201/126
See application file for complete search history.

(56) References Cited

U.S. PATENT DOCUMENTS

| | | | |
|---|---|---|---|
| 4,530,777 | A | 7/1985 | Kennedy |
| 2012/0237759 | A1 | 9/2012 | Ehbing et al. |
| 2015/0210035 | A1 | 7/2015 | Rippel et al. |

FOREIGN PATENT DOCUMENTS

| | | |
|---|---|---|
| CN | 102947362 A | 2/2013 |
| CN | 103881052 A | 6/2014 |
| EP | 2386585 A1 | 11/2011 |
| EP | 2677030 A1 | 12/2013 |
| EP | 2 881 413 A1 | 6/2015 |
| JP | 7-82338 | 3/1995 |
| KR | 10-2010-0002101 | 1/2010 |
| WO | 97/16477 | 5/1997 |
| WO | 2011/131568 A1 | 10/2011 |

OTHER PUBLICATIONS

Sain et al.; "Structure of Glycerol and Cellulose Fiber Modified Water Blown Soy Polyol-based Polyurethane Foanns";(Journal of Reinforced Plastics and Composites) pp. 1745-1758. (Year: 2008).*
Faludi et al. (Journal of Applied Polymer Science) PLA/Lignocellulosic Fiber Composites: Particle Characteristics, Interfacial Adhesion, and Failure Mechanism (2014), DOI:10.1002/APP. 39902. (Year: 2014).*
U. Cabulis et al.: "Rigid polyurethane foams obtained from tall oil and filled with natural fibers: Application as a support for immobilization of lignin-degrading microorganisms" Journal of Cellular Plastics, May 23, 2012 (May 23, 2012) XP055039975.
M. Kirpluks et al.: "Renewable resources as raw materials for energy saving thermal insulation" Jan. 1, 2012, XP055040139.

(Continued)

*Primary Examiner* — John M Cooney
(74) *Attorney, Agent, or Firm* — Staas & Halsey LLP

(57) ABSTRACT

Embodiments of the present disclosure relate to a polyurethane foam, a refrigerator including the same, and a method of manufacturing polyurethane foam.

According with the present inventions, a refrigerator, comprising a polyurethane foam formed of a composition for preparing polyurethane, includes a cabinet; a door configured to open and close the cabinet; and a thermal insulation disposed in at least one of the cabinet and the door, wherein the thermal insulation includes a polyurethane foam-forming polyol system comprising a fiber having hydroxyl groups; and isocyanate.

14 Claims, 15 Drawing Sheets

(56) References Cited

OTHER PUBLICATIONS

Extended European Search Report dated Apr. 20, 2017 in corresponding European Patent Application No. 16203001.9.
Chinese Office Action dated Dec. 19, 2018 in corresponding Chinese Patent Application No. 201611139303.7.

* cited by examiner

POLYURETHANE FOAM, REFRIGERATOR INCLUDING THE SAME, AND METHOD OF MANUFACTURING POLYURETHANE FOAM

CROSS-REFERENCE TO RELATED APPLICATION(S)

This application claims the benefit of Korean Patent Application No. 10-2015-0177888, filed on Dec. 14, 2015 in the Korean Intellectual Property Office, the disclosure of which is incorporated herein by reference.

BACKGROUND

1. Field

Embodiments of the present disclosure relate to a polyurethane foam, a refrigerator including the same, and a method of manufacturing polyurethane foam.

2. Description of the Related Art

Insulated walls of a refrigerator include an outer case made of a steel plate, an inner case molded from acrylonitrile-butadiene-styrene (ABS) or high impact polystyrene (HIPS), and a thermal insulation formed of hard polyurethane foam and interposed therebetween.

The hard polyurethane foam provides the refrigerator with thermal insulation property and rigidity. Particularly, hard polyurethane foam used for refrigerators is formed of closed cells and low thermal conductivity and low density of a foaming gas filled in the cells provide thermal insulation property to the refrigerators. Also, the refrigerator may have rigidity due to a chemically crosslinked structure formed of a large number of functional groups of polyol and isocyanate.

SUMMARY

Therefore, it is an aspect of the present disclosure to provide a thermal insulation formed of urethane including a fiber and a refrigerator including the same. In this case, the fiber may have hydroxyl groups.

Additional aspects of the disclosure will be set forth in part in the description which follows and, in part, will be obvious from the description, or may be learned by practice of the disclosure.

According with the present inventions, a refrigerator, comprising a polyurethane foam formed of a composition for preparing polyurethane, includes a cabinet; a door configured to open and close the cabinet; and a thermal insulation disposed in at least one of the cabinet and the door, wherein the thermal insulation includes a polyurethane foam-forming polyol system comprising a fiber having hydroxyl groups; and isocyanate.

The fiber having hydroxyl groups may comprise at least one selected from the group consisting of cellulose fiber, linen fiber, flax fiber, polyvinyl alcohol fiber, and carbon fiber treated with hydroxyl groups.

The polyurethane foam may have a total density of 28 to 50 $kg/m^3$ and a central density of 25 to 45 $kg/m^3$.

The fiber may comprise at least one of nanofiber and microfiber.

An amount of the nanofiber may be in the range of 0.01 to 1 parts by weight based on a total weight of the composition.

An amount of the microfiber may be in the range of 0.01 to 0.5 parts by weight based on the total weight of the composition.

The nanofiber may have a diameter of 10 to 20 nm and an aspect ratio of 5 to 150.

The microfiber may have a diameter of 1 to 5 and an aspect ratio of 2 to 150.

The polyol system may comprise a polyol, a blowing agent, and an additive.

According with the present invention, a polyurethane foam formed of a composition for preparing polyurethane includes a polyurethane foam-forming polyol system comprising a fiber having hydroxyl groups; and isocyanate.

The fiber having hydroxyl groups may comprise at least one selected from the group consisting of cellulose fiber, linen fiber, flax fiber, polyvinyl alcohol fiber, and carbon fiber treated with hydroxyl groups.

The polyurethane foam may have a total density of 28 to 50 $kg/m^3$ and a central density of 25 to 45 $kg/m^3$.

The fiber may comprise at least one of nanofiber and microfiber.

An amount of the nanofiber may be in the range of 0.01 to 1 parts by weight based on a total weight of the composition.

An amount of the microfiber may be in the range of 0.01 to 0.5 parts by weight based on the total weight of the composition.

The nanofiber may have a diameter of 10 to 20 nm and an aspect ratio of 5 to 150.

The microfiber may have a diameter of 1 to 5 and an aspect ratio of 2 to 150.

The polyol system may comprise a polyol, a blowing agent, and an additive.

According with the present inventions, a method of manufacturing a polyurethane foam include mixing a polyol system with a fiber having hydroxyl groups; mixing the polyol system mixture with isocyanate: and foaming the mixture.

The fiber having hydroxyl groups may comprise at least one selected from the group consisting of cellulose fiber, linen fiber, flax fiber, polyvinyl alcohol fiber, and carbon fiber treated with hydroxyl groups.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
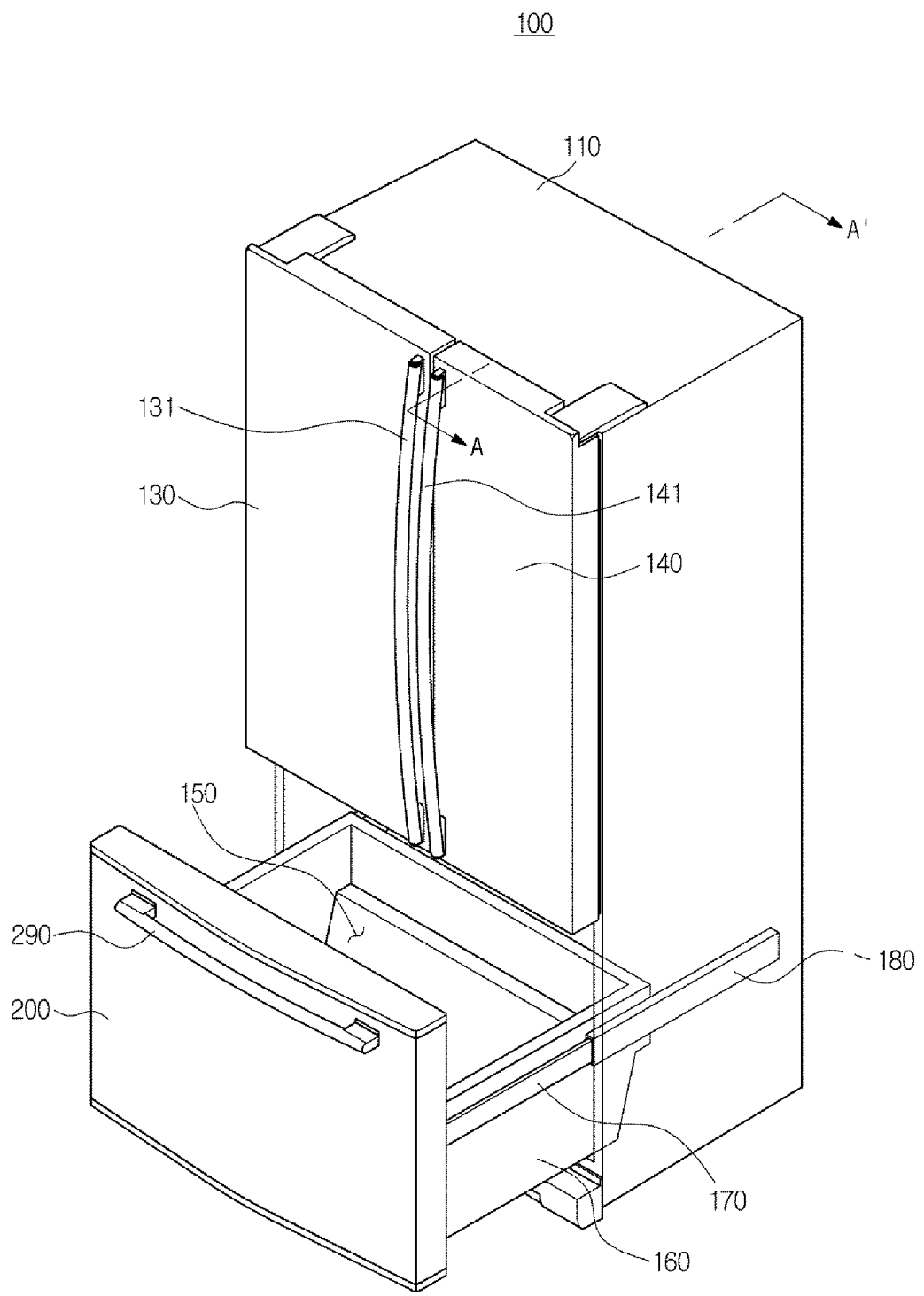
FIG. 1 is a perspective view illustrating an appearance of a refrigerator according to an embodiment.

Reference will now be made in detail to the embodiments of the present disclosure, examples of which are illustrated in the accompanying drawings, wherein like reference numerals refer to like elements throughout.

Hereinafter, a polyurethane foam, a refrigerator including the same, and a method of manufacturing the polyurethane foam according to embodiments will be described in detail.

Polyurethane foam according to an embodiment, as a thermal insulation, may be applied to all types of electronic appliances that require a thermal insulation structure. For example, the polyurethane foam may be applied to insulated walls of cooking apparatuses or insulated walls of refrigerators. Hereinafter, the embodiments will be described based on a polyurethane foam applied to insulated walls of refrigerators for descriptive convenience.

Figure 2:
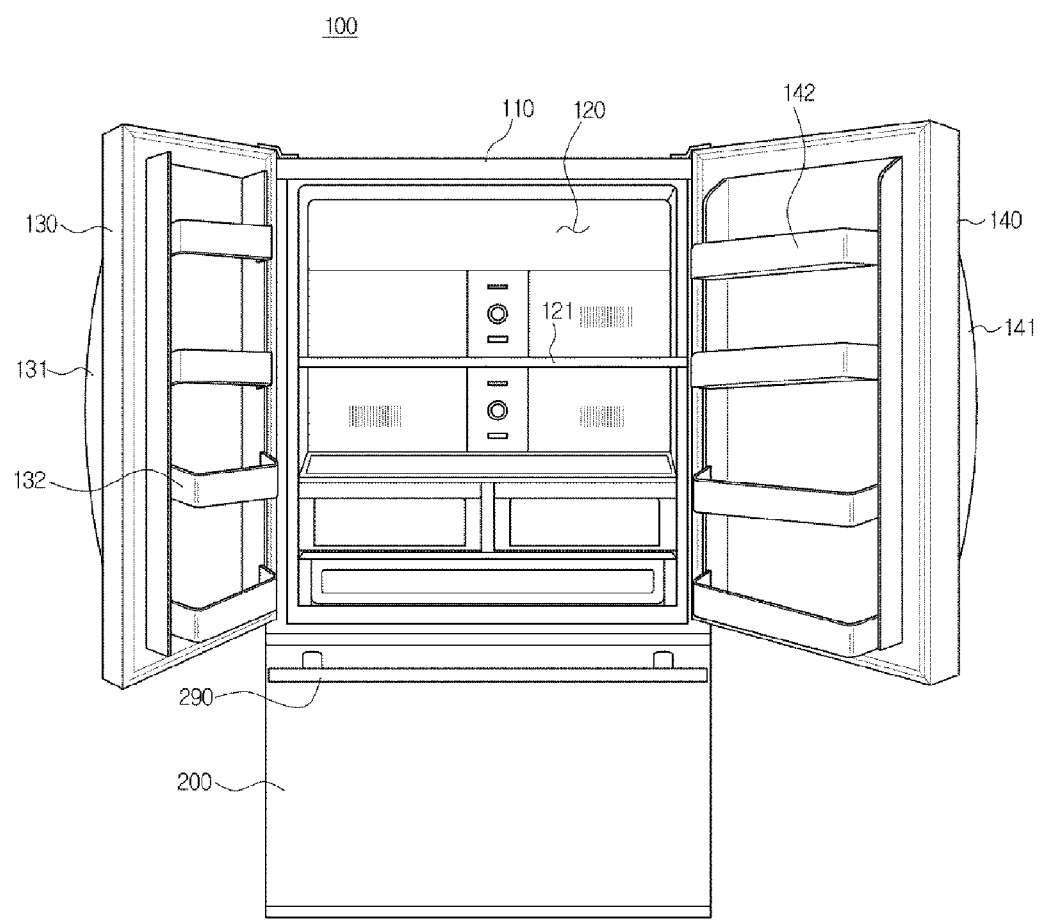
FIG. 2 is an interior view of the refrigerator.
Figure 3:
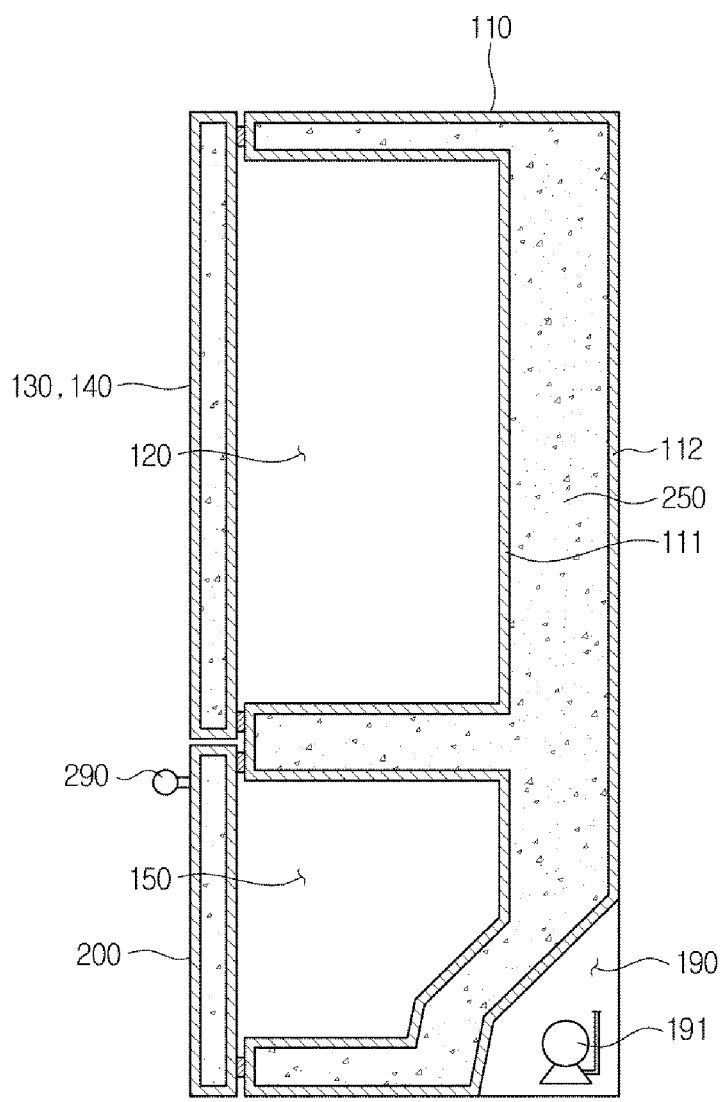
FIG. 3 is a cross-sectional view of the refrigerator taken along line AA.

FIG. 1 is a perspective view illustrating an appearance of a refrigerator according to an embodiment. FIG. 2 is an interior view of the refrigerator. FIG. 3 is a cross-sectional view of the refrigerator taken along line AA.

Referring to FIGS. 1 to 3, a refrigerator 100 may include a cabinet 110, storage compartments 120 and 150 formed in the cabinet 110, storage compartment doors 130, 140, and 200 rotatably disposed at a front surface of the cabinet 110 to shield the storage compartments 120 and 150 from the outside, and a cool air supply apparatus (not shown) to supply cool air into the storage compartment 120 and 150.

The cabinet 110 may include an inner case 111 constituting the storage compartments, an outer case 112 coupled to outer surfaces of the inner case 111, and a thermal insulation 250 filled between the inner case 111 and the outer case 112 to prevent leakage of cool air out of the storage compartments 120 and 150 and introduction of external warm air into the storage compartments 120 and 150.

The thermal insulation 250 may be polyurethane foam 250. Particularly, the thermal insulation 250 may be formed of a composition for preparing polyurethane including a polyurethane foam-forming polyol system including a fiber having hydroxyl groups and isocyanate. Hereinafter, the terms thermal insulation 250 and polyurethane foam 250 will be used interchangeably.

The polyurethane foam 250 may have a total density of 28 to 50 kg/m$^3$ and a central density of 25 to 45 kg/m$^3$. That is, a portion farther from the center of the polyurethane foam 250 has a higher density. The polyurethane foam 250 used as the thermal insulation 250 of the refrigerator will be described later.

A machine room 190 may be disposed at a lower portion of the cabinet 110. The machine room 190 accommodates parts such as a compressor 191 in which a refrigerant is compressed at a high temperature and high pressure. Since a large amount of heat is generated in the machine room 190, the polyurethane foam 250 according to an embodiment may be used to prevent heat transfer into the storage compartments 120 and 150.

The storage compartments 120 and 150 may be partitioned into an upper refrigerator compartment 120 and a lower freezer compartment 150 by a middle wall. The refrigerator compartment 150 may be maintained at a temperature of about 3° C., and the freezer compartment 150 may be maintained at a temperature of about −18° C.

The refrigerator compartment 120 has an open front to store food. The open front may be opened and closed by a pair of refrigerator compartment doors 130 and 140 rotatably coupled thereto via a hinge member (not shown). The refrigerator compartment doors 130 and 140 include a left door 130 to open and close a left part of the refrigerator compartment 120 and a right door 140 to open and close a right part of the refrigerator compartment 120. Shelves 121 on which food is placed may be arranged in the refrigerator compartment 120.

Refrigerator compartment door handles 131 and 141 used to open and close the refrigerator compartment doors 130 and 140 may be provided at front surfaces of the refrigerator compartment doors 130 and 140. The refrigerator compartment door handles 131 and 141 may include a left door handle 131 used to open the left part of the refrigerator compartment 120 and a right door handle 141 used to open the right part of the refrigerator compartment 140. Also, door guards 132 and 142 on which food is placed may be provided at rear surfaces of the refrigerator compartment doors 130 and 140. The door guards 132 and 142 may include a left door guard 132 disposed at the rear surface of the left door 130 and a right door guard 142 disposed at the rear surface of the right door 140.

Meanwhile, the polyurethane foam 250 according to an embodiment may be applied to insides of the refrigerator compartment doors 130 and 140 to prevent leakage of cool air from the refrigerator compartment 120 and introduction of external warm air into the refrigerator compartment 120.

The freezer compartment 150 may have an open front to store food. The open front may be opened and closed by a freezer compartment door 200 sliding forward and backward. A storage box 160 may be disposed at a rear surface of the freezer compartment door 200.

The freezer compartment door 200 and the storage box 160 may be provided with movable rail units 170, and the movable rail unit 170 may be slidably supported by fixed rail units 180 disposed at the cabinet 110. Thus, the freezer compartment door 200 and the storage box 160 may slide into and out of the cabinet 110. A freezer compartment door handle 290 used to open and close freezer compartment door 200 may be disposed at the front surface of the freezer compartment door 200.

Meanwhile, the polyurethane foam 250 according to an embodiment may be applied to the freezer compartment door 200 to prevent leakage of cool air from the freezer compartment 150 and introduction of external warm air into the freezer compartment 150.

The cool air supply device may include a compressor 191 to compress the refrigerant, a condenser (not shown) to condense the refrigerant, a capillary pipe (not shown) to expand the refrigerant, and an evaporator (not shown) to generate cool air by evaporating the refrigerant.

An example of the structure of the refrigerator has been described above.

Next, the polyurethane foam 250 according to an embodiment applied to the refrigerator 100 will be described in detail. Hereinafter, a case in which the polyurethane foam 250 according to an embodiment is applied to the freezer compartment door 200 will be exemplarily described for descriptive convenience.

Figure 4:
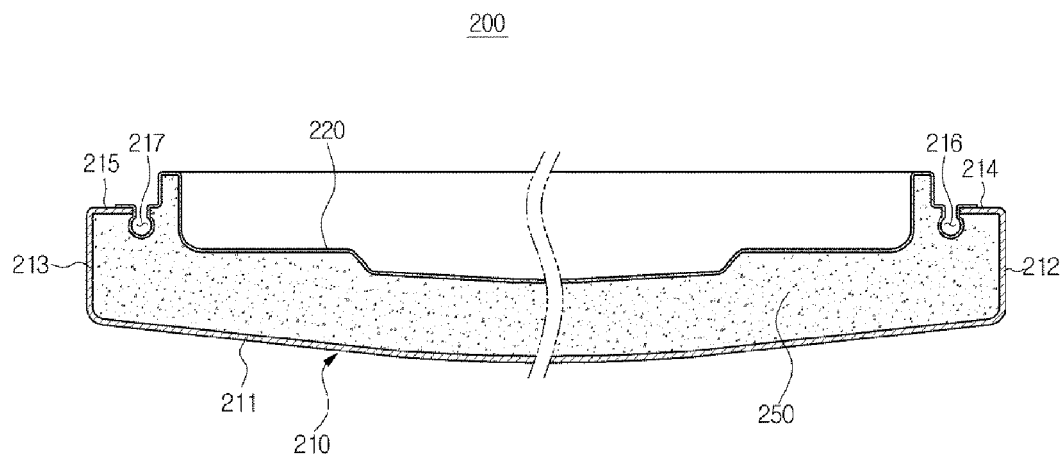
FIG. 4 is a cross-sectional view illustrating a structure of the freezer compartment door of the refrigerator of FIG. 1.
Figure 5:
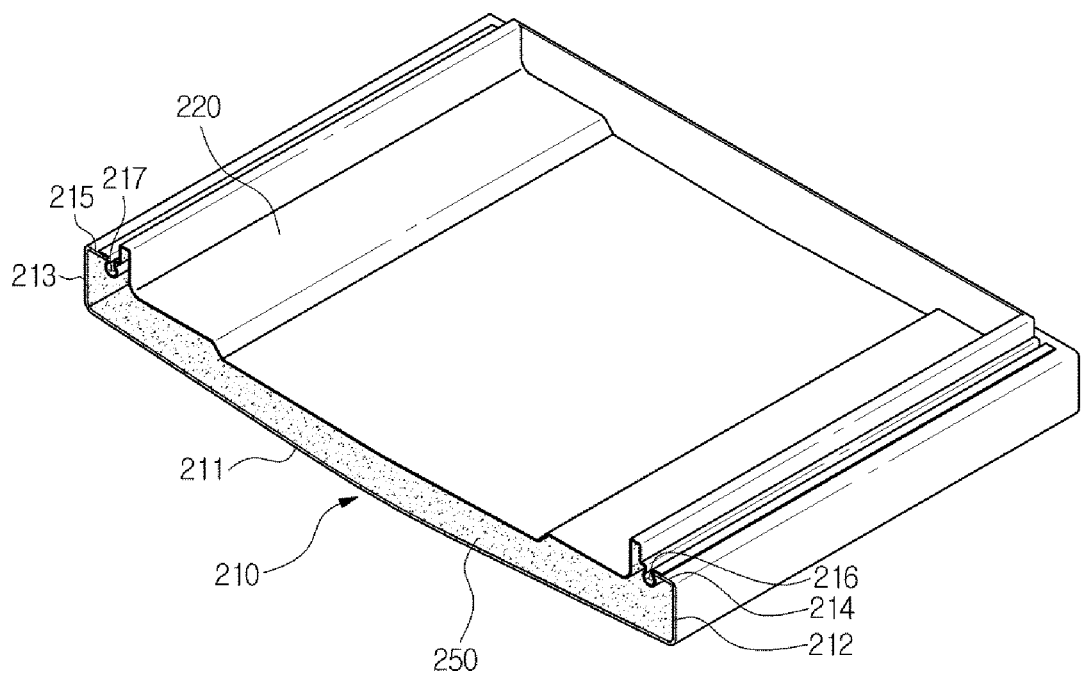
FIG. 5 is a partially cut perspective view illustrating the structure of the freezer compartment door of FIG. 1.
Figure 6:
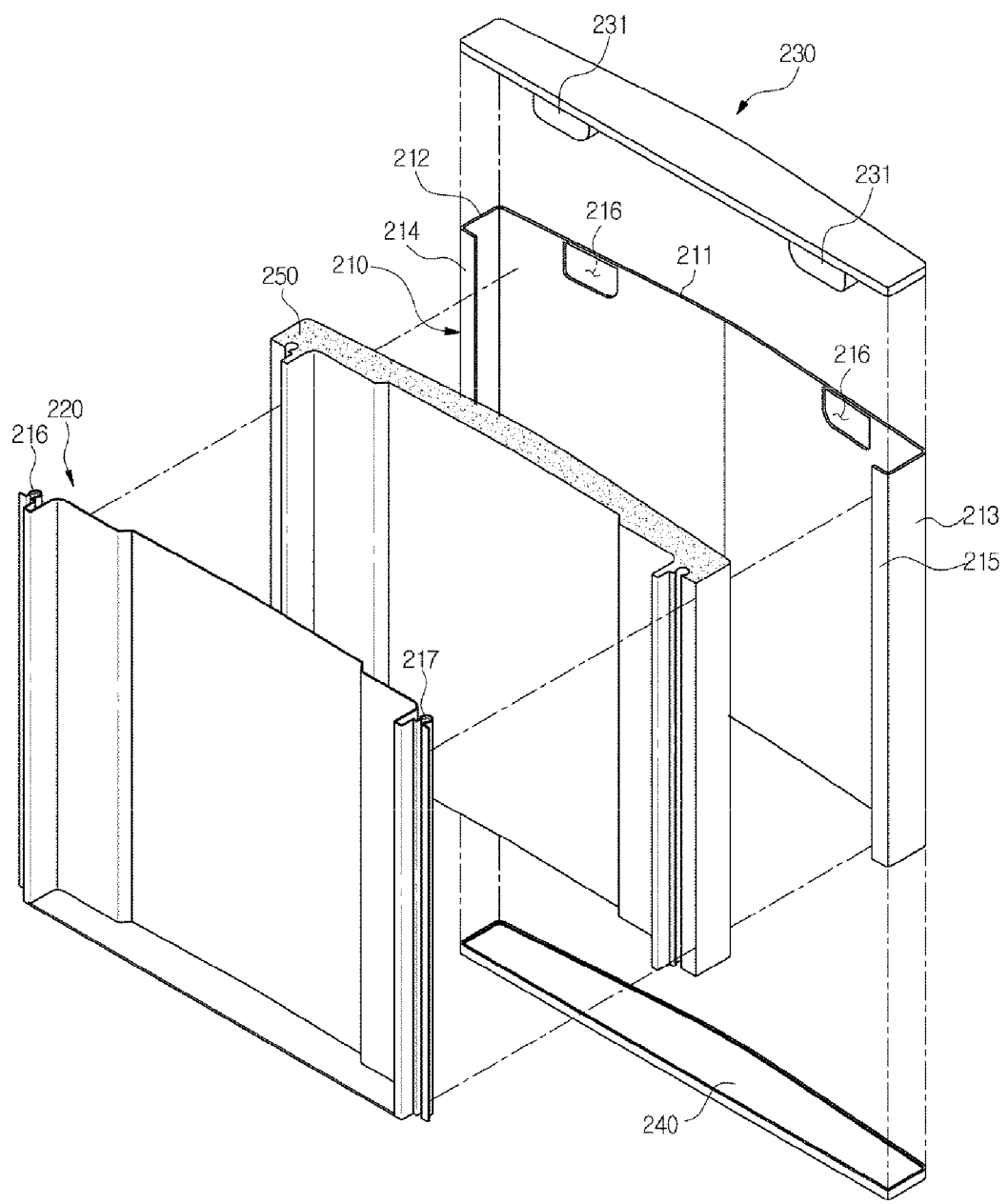
FIG. 6 is an exploded perspective view illustrating the structure of the freezer compartment door of FIG. 1.
Figure 7:
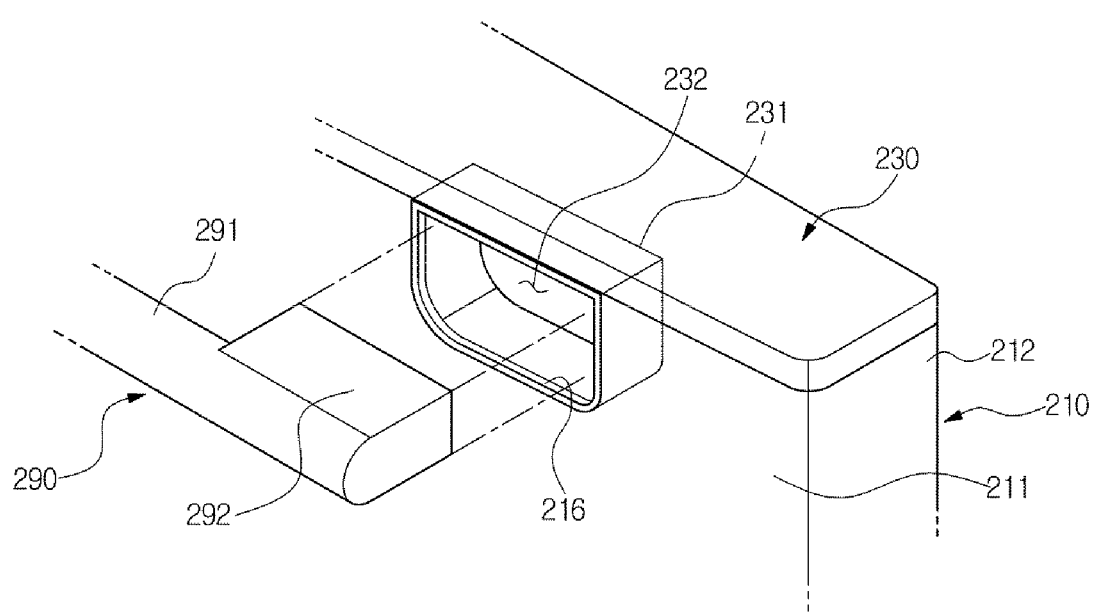
FIG. 7 is a view illustrating a structure in which the freezer compartment door handle is coupled to the freezer compartment door of FIG. 4.

FIG. 4 is a cross-sectional view illustrating a structure of the freezer compartment door 200 of the refrigerator 100 of FIG. 1. FIG. 5 is a partially cut perspective view illustrating the structure of the freezer compartment door 200 of FIG. 1. FIG. 6 is an exploded perspective view illustrating the structure of the freezer compartment door 200 of FIG. 1. FIG. 7 is a view illustrating a structure in which the freezer compartment door handle 290 is coupled to the freezer compartment door 200 of FIG. 4.

Referring to FIGS. 4 to 7, the freezer compartment door 200 according to an embodiment may include an outer plate 210, an inner plate 220, an upper cap 230, and a lower cap 240. The outer plate 210, the inner plate 220, the upper cap 230, and the lower cap 240 are assembled to constitute an inner space.

The inner space may be a closed space, and the polyurethane foam 250 according to an embodiment may be disposed between the outer plate 210 and the inner plate 220. The polyurethane foam 250 may be provided by filling liquid urethane between the outer plate 210 and the inner plate 220, which will be described later.

The outer plate 210 may have a front 211 constituting a front surface of the freezer compartment door 200, sides 212 and 213 constituting both side surfaces of the freezer compartment door 200, and coupling portions 214 and 215 coupled to the inner plate 220. The outer plate 210 may be made of wood, plastic, or any combination thereof to improve rigidity and the external appearance and may be surface-treated to improve the external appearance and durability. Also, the front 211 of the outer plate 210 may be coated with a transparent or opaque paint or varnish and treated with a coating material having waterproof and antibacterial properties.

The inner plate 220 is coupled to the rear surface of the outer plate 210 and constitute the rear surface of the freezer compartment door 200. The inner plate 220 may have concave portions 216 and 217 at end portions thereof such that a gasket (not shown) is disposed therein. In the same manner as the output plate 210, the inner plate 220 may also be made of wood, plastic, or any combination thereof. Descriptions provided above with regard to the outer plate 210 will not be repeated herein.

The upper cap 230 is coupled to upper ends of the outer plate 210 and the inner plate 220. The lower cap 240 is coupled to lower ends of the outer plate 210 and the inner plate 220. The upper cap 230 constitutes a top surface of the freezer compartment door 200, and the lower cap 240 constitutes a bottom surface of the freezer compartment door 200. The upper cap 230 and the lower cap 240 may be made of the same material as the outer plate 210 or the inner plate 220. Also, a sealing member may be applied to the upper cap 230 and the lower cap 240.

The upper cap 230 may have an accommodation portion 231 to which the freezer compartment door handle 290 is coupled. The accommodation portion 231 may protrude backward from the front surface of the freezer compartment door 200, and the accommodation portion 231 may have an accommodation space 232 to accommodate a coupling unit 292 of the freezer compartment door handle 290.

The freezer compartment door handle 290 may have a hand grip part 291 and the coupling unit 292 to couple the freezer compartment door handle 290 to the freezer compartment door 200. A plurality of coupling units 292 may be disposed at both ends of the hand grip part 291.

The freezer compartment door handle 290 may be coupled to the freezer compartment door 200 by force-fitting the coupling unit 292 into the accommodation space 232. The coupling unit 292 and the accommodation portion 231 may also be coupled together by any other coupling member, which is not illustrated herein, in order to increase binding force between the freezer compartment door handle 290 and the freezer compartment door 200.

The outer plate 210 may have an opening 216 through which the coupling unit 292 of the freezer compartment door handle 290 passes to be accommodated in the accommodation space 232 of the upper cap 230.

The polyurethane foam 250 according to an embodiment applied to the freezer compartment door 200 has been exemplarily described above. However, this structure may also be applied to the refrigerator compartment doors 130 and 140, the cabinet 110, and the like within a range obvious to one of ordinary skill in the art. Hereinafter, descriptions of the freezer compartment door 200 may also include descriptions of the refrigerator compartment doors 130 and 140 and the cabinet 110.

Next, the polyurethane foam 250 according to an embodiment will be described in more detail.

The polyurethane foam 250 according to an embodiment may be formed of a composition for preparing polyurethane including a polyurethane foam-forming polyol system including fibers having hydroxyl groups and isocyanate.

Since the polyol system includes a fiber having hydroxyl groups, the polyurethane foam 250 according to an embodiment may have rigidity. Thus, when the polyurethane foam 250 according to an embodiment is applied to refrigerators, and the like, an amount of urethane may be reduced due to less deformation such as shrinkage and warpage.

Hereinafter, ingredients of the composition for preparing polyurethane will be described in more detail.

First, the polyol system may include a polyol, a blowing agent, an additive, and a fiber having hydroxyl groups. The polyol system may react with isocyanate to create polyurethane. Hereinafter, the polyol system may also be referred to as liquid polyol.

The polyol is an aliphatic compound including at least two hydroxyl groups serving as a framework of the polyol system. The polyol is hydrophilic by the hydroxyl groups thereof and uniformly mixed with the fiber having hydroxyl groups which will be described later.

Examples of the polyol may include ethylene glycol, propylene glycol, and tetramethylene glycol, without being limited thereto.

The blowing agent is a substance capable of producing foam via polymerization. Blowing agents are classified into chemical blowing agents and physical blowing agents. According to an embodiment, the blowing agent may include water and cyclopentane.

Water, as a chemical blowing agent, may react with isocyanate groups to produce carbon dioxide.

As a physical blowing agent, cyclopentane, when incorporated in the polyol system may generate heat to generate foam but is not involved in polymerization. Meanwhile, examples of the physical blowing agent are not limited to cyclopentane, and Freon, hydrochlorofluorocarbon, or the like may also be used.

The additive may include a catalyst and a surfactant. The surfactant may be a silicone-based surfactant. The polyol and isocyanate may be uniformly mixed by using these additives.

The fiber having hydroxyl groups is a compound in which functional groups of the surface thereof are substituted with hydroxyl groups. The fiber having hydroxyl groups introduced into the polyol system may improve strength of the polyurethane foam 250. Since the polyol is hydrophilic as described above, the fiber having a surface into which hydroxyl groups are introduced may be uniformly mixed with the polyol system. In other words, the fiber having hydroxyl groups is highly compatible with the polyol system due to the hydroxyl groups disposed on the surface thereof, resulting in increasing storage stability. Also, the fiber having hydroxyl groups is dispersible in the polyol system allowing the polyurethane foam 250 to have uniform strength.

The fiber having hydroxyl groups may be added to the polyol system in a very small amount. According to an embodiment, an amount of the fiber having hydroxyl groups may be 0.01 to 1 parts by weight based on a total weight of the composition. For example, if the fiber is microfiber, the amount of the microfiber may be in the range of 0.01 to 0.5 parts by weight based on the total weight of the composition. If the fiber is nanofiber, the amount of the nanofiber may be in the range of 0.01 to 0.1 parts by weight based on the total weight of the composition. According to an embodiment, strength of the polyurethane foam 250 may be improved by adding a small amount of the fiber to the polyol system. As a result, a rapid increase in viscosity that is a side effect of adding fiber to the polyol system may be prevented.

The fiber having hydroxyl groups may be microfiber or nanofiber. For example, the microfiber may have a diameter of 1 to 5 and an aspect ratio (L/D) of 2 to 150. In addition, the nanofiber may have a diameter of 10 to 20 nm and an aspect ratio of 5 to 150.

In general, a filter and a nozzle of a high-pressure foaming apparatus transporting a liquid including fibers are more easily clogged as the size of fibers increases, and thus a foaming process may not be normally performed. However, by using the fibers according to an embodiment satisfying the conditions described above, the filter or nozzle of the high-pressure foaming apparatus may not be clogged with the fibers. Also, since the microfiber or nanofiber serves as a nucleating agent while producing the polyurethane foam 250, the polyurethane foam 250 may have a smaller cell size, resulting in improving thermal conductivity of polyurethane foam 250.

Examples of the fiber having hydroxyl groups may include cellulose fiber, linen fiber, flax fiber, polyvinyl alcohol fiber, and carbon fiber treated with hydroxyl groups. However, the types of the fiber are not limited thereto and may be understood to include modifications obvious to one of ordinary skill in the art.

Figure 8:
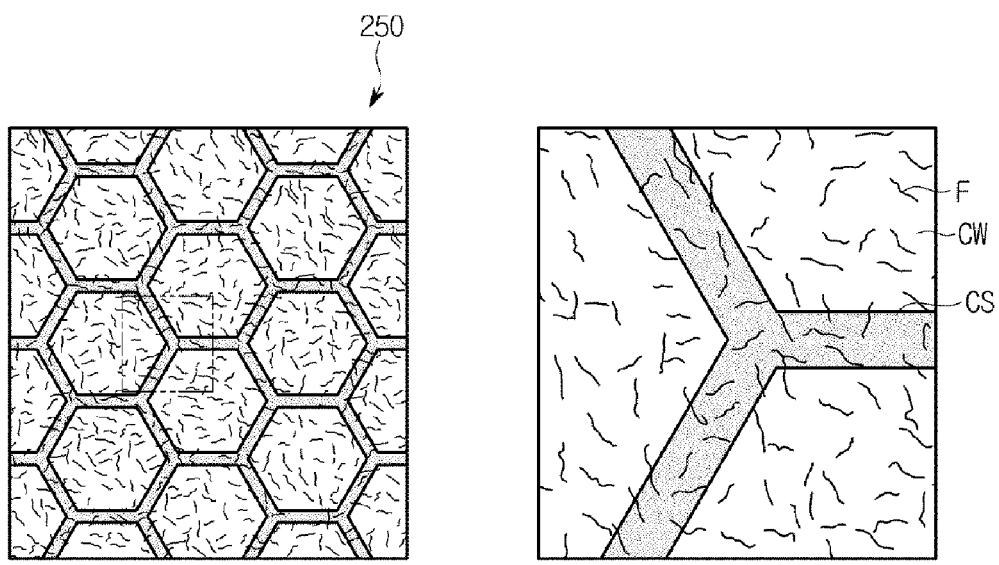
FIG. 8 is an enlarged cross-sectional view of the polyurethane foam according to an embodiment.

FIG. 8 is an enlarged cross-sectional view of the polyurethane foam 250 according to an embodiment.

Referring to FIG. 8, the polyurethane foam 250 is formed of closed cells filled with a foaming gas. The foaming gas may include carbon dioxide. Hereinafter, a portion constituting a framework of the cell structure is referred to as cell strut CS and a portion constituting a wall of the cell structure is referred to as cell wall CW.

Referring to FIG. 8, fibers F are uniformly dispersed in the cell strut CS and the cell wall CW. Thus, if a stress is applied to the polyurethane foam 250, the stress may be uniformly distributed to the fibers F, resulting in an increase in strength of the polyurethane foam 250.

The polyurethane foam 250 described above may be manufactured by the following process.

Figure 9:
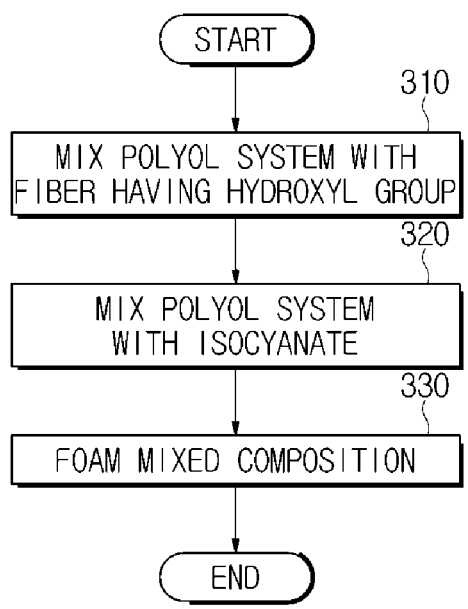
FIG. 9 is a flowchart schematically illustrating a process of manufacturing the polyurethane foam according to an embodiment.

FIG. 9 is a flowchart schematically illustrating a process of manufacturing the polyurethane foam 250 according to an embodiment.

Referring to FIG. 9, the method of manufacturing the polyurethane foam 250 according to an embodiment includes: mixing a polyol system with a fiber having hydroxyl groups (310), mixing a mixture of the polyol system and the fiber with isocyanate (320), and foaming the mixed composition (330).

More particularly, the polyurethane foam 250 according to an embodiment may be manufactured by adding the fiber having hydroxyl groups to the polyol system including a polyol, a blowing agent, and an additive and uniformly stirring the mixture (310), and adding isocyanate to the mixture and foaming a resultant mixture (320 and 330). Since the nanoscale or microscale fibers are used as described above, the mixture may be foamed through a filter or nozzle of a high-pressure foaming apparatus without causing clogging.

The polyurethane foam 250 and the method of manufacturing the same according to embodiments of the present disclosure have been described above.

Hereinafter, the polyurethane foam 250 according to one or more embodiments of the present disclosure will be described in detail with reference to the following experimental examples. These examples are not intended to limit the purpose and scope of the one or more embodiments of the present disclosure.

Example 1

A composition for preparing polyurethane according to Example 1 includes 100 g of a polyol, 2.5 g of a surfactant, 0.45 g of a blowing catalyst, 2.10 g of a gelling catalyst, 0.7 g of a trimerization catalyst, 1.90 g of water, 16.5 g of cyclopentane, 149.0 g of polyisocyanate, and 0.27 g of cellulose microfiber. Polymeric methylene diphenyl diisocyanate was used as polyisocyanate, and cellulose microfiber having a length of 50 to 70 μm was used.

Example 2

A composition for preparing polyurethane according to Example 2 includes 100 g of the polyol, 2.5 g of the surfactant, 0.45 g of the blowing catalyst, 2.10 g of the gelling catalyst, 0.7 g of the trimerization catalyst, 1.90 g of water, 16.5 g of cyclopentane, 149.0 g of polyisocyanate, and 0.82 g of cellulose microfiber. Polymeric methylene diphenyl diisocyanate was used as polyisocyanate, and cellulose microfiber having a length of 50 to 70 μm was used.

Example 3

A composition for preparing polyurethane according to Example 3 includes 100 g of the polyol, 2.5 g of the surfactant, 0.45 g of the blowing catalyst, 2.10 g of the gelling catalyst, 0.7 g of the trimerization catalyst, 1.90 g of water, 16.5 g of cyclopentane, 149.0 g of polyisocyanate, and 1.36 g of cellulose microfiber. Polymeric methylene diphenyl diisocyanate was used as polyisocyanate, and cellulose microfiber having a length of 50 to 70 μm was used.

Example 4

A composition for preparing polyurethane according to Example 4 includes 100 g of the polyol, 2.5 g of the surfactant, 0.45 g of the blowing catalyst, 2.10 g of the gelling catalyst, 0.7 g of the trimerization catalyst, 1.90 g of water, 16.5 g of cyclopentane, 149.0 g of polyisocyanate, and 0.27 g of cellulose nanofiber. Polymeric methylene diphenyl diisocyanate was used as polyisocyanate, and cellulose nanofiber having a length of 500 to 1000 nm was used.

Example 5

A composition for preparing polyurethane according to Example 5 includes 100 g of the polyol, 2.5 g of the surfactant, 0.45 g of the blowing catalyst, 2.10 g of the gelling catalyst, 0.7 g of the trimerization catalyst, 1.90 g of water, 16.5 g of cyclopentane, 149.0 g of polyisocyanate, and 0.82 g of cellulose nanofiber. Polymeric methylene diphenyl diisocyanate was used as polyisocyanate, and cellulose nanofiber having a length of 500 to 1000 nm was used.

Example 6

A composition for preparing polyurethane according to Example 6 includes 100 g of the polyol, 2.5 g of the surfactant, 0.45 g of the blowing catalyst, 2.10 g of the gelling catalyst, 0.7 g of the trimerization catalyst, 1.90 g of water, 16.5 g of cyclopentane, 149.0 g of polyisocyanate, and 1.36 g of cellulose nanofiber. Polymeric methylene diphenyl diisocyanate was used as polyisocyanate, and cellulose nanofiber having a length of 500 to 1000 nm was used.

Example 7

A composition for preparing polyurethane according to Example 7 includes 100 g of the polyol, 2.5 g of the surfactant, 0.45 g of the blowing catalyst, 2.10 g of the gelling catalyst, 0.7 g of the trimerization catalyst, 1.90 g of water, 16.5 g of cyclopentane, 149.0 g of polyisocyanate, and 2.73 g of cellulose nanofiber. Polymeric methylene diphenyl diisocyanate was used as polyisocyanate, and cellulose nanofiber having a length of 500 to 1000 nm was used.

Example 8

A composition for preparing polyurethane according to Example 8 includes 100 g of the polyol, 2.5 g of the surfactant, 0.45 g of the blowing catalyst, 2.10 g of the gelling catalyst, 0.7 g of the trimerization catalyst, 1.90 g of water, 16.5 g of cyclopentane, 149.0 g of polyisocyanate, and 0.82 g of cellulose microfiber. Polymeric methylene diphenyl diisocyanate was used as polyisocyanate, and cellulose microfiber having a length of 10 to 20 μm was used.

Example 9

A composition for preparing polyurethane according to Example 9 includes 100 g of the polyol, 2.5 g of the surfactant, 0.45 g of the blowing catalyst, 2.10 g of the gelling catalyst, 0.7 g of the trimerization catalyst, 1.90 g of water, 16.5 g of cyclopentane, 149.0 g of polyisocyanate, and 0.82 g of cellulose microfiber. Polymeric methylene diphenyl diisocyanate was used as polyisocyanate, and cellulose microfiber having a length of 30 to 70 μm was used.

Example 10

A composition for preparing polyurethane according to Example 10 includes 100 g of the polyol, 2.5 g of the surfactant, 0.45 g of the blowing catalyst, 2.10 g of the gelling catalyst, 0.7 g of the trimerization catalyst, 1.90 g of water, 16.5 g of cyclopentane, 149.0 g of polyisocyanate, and 0.82 g of cellulose microfiber. Polymeric methylene diphenyl diisocyanate was used as polyisocyanate, and cellulose microfiber having a length of 100 to 150 μm was used.

Example 11

A composition for preparing polyurethane according to Example 11 includes 100 g of the polyol, 2.5 g of the surfactant, 0.45 g of the blowing catalyst, 2.10 g of the gelling catalyst, 0.7 g of the trimerization catalyst, 1.90 g of water, 16.5 g of cyclopentane, 149.0 g of polyisocyanate, and 0.82 g of cellulose nanofiber. Polymeric methylene diphenyl diisocyanate was used as polyisocyanate, and cellulose nanofiber having a length of 100 to 200 nm was used.

Example 12

A composition for preparing polyurethane according to Example 12 includes 100 g of the polyol, 2.5 g of the surfactant, 0.45 g of the blowing catalyst, 2.10 g of the gelling catalyst, 0.7 g of the trimerization catalyst, 1.90 g of water, 16.5 g of cyclopentane, 149.0 g of polyisocyanate, and 0.82 g of cellulose nanofiber. Polymeric methylene diphenyl diisocyanate was used as polyisocyanate, and cellulose nanofiber having a length of 200 to 500 nm was used.

Example 13

A composition for preparing polyurethane according to Example 13 includes 100 g of the polyol, 2.5 g of the surfactant, 0.45 g of the blowing catalyst, 2.10 g of the gelling catalyst, 0.7 g of the trimerization catalyst, 1.90 g of water, 16.5 g of cyclopentane, 149.0 g of polyisocyanate, and 0.82 g of cellulose nanofiber. Polymeric methylene diphenyl diisocyanate was used as polyisocyanate, and cellulose nanofiber having a length of 500 to 1000 nm was used.

Example 14

A composition for preparing polyurethane according to Example 14 includes 100 g of the polyol, 2.5 g of the surfactant, 0.45 g of the blowing catalyst, 2.10 g of the gelling catalyst, 0.7 g of the trimerization catalyst, 1.90 g of water, 16.5 g of cyclopentane, 149.0 g of polyisocyanate, and 0.82 g of cellulose nanofiber. Polymeric methylene diphenyl diisocyanate was used as polyisocyanate, and cellulose nanofiber having a length of 1000 to 3000 nm was used.

Comparative Example 1

A composition for preparing polyurethane according to Comparative Example 1 includes 100 g of the polyol, 2.5 g of the surfactant, 0.45 g of the blowing catalyst, 2.10 g of the gelling catalyst, 0.7 g of the trimerization catalyst, 1.90 g of water, 16.5 g of cyclopentane, and 149.0 g of polyisocyanate. Polymeric methylene diphenyl diisocyanate was used as polyisocyanate, and cellulose microfiber was not added thereto.

Comparative Example 2

A composition for preparing polyurethane according to Comparative Example 2 includes 100 g of the polyol, 2.5 g of the surfactant, 0.45 g of the blowing catalyst, 2.10 g of the gelling catalyst, 0.7 g of the trimerization catalyst, 1.90 g of water, 16.5 g of cyclopentane, 149.0 g of polyisocyanate, and 2.73 g of cellulose microfiber. Polymeric methylene diphenyl diisocyanate was used as polyisocyanate, and cellulose microfiber having a length of 50 to 70 μm was used.

Comparative Example 3

A composition for preparing polyurethane according to Comparative Example 3 includes 100 g of the polyol, 2.5 g of the surfactant, 0.45 g of the blowing catalyst, 2.10 g of the gelling catalyst, 0.7 g of the trimerization catalyst, 1.90 g of water, 16.5 g of cyclopentane, 149.0 g of polyisocyanate, and 3.00 g of cellulose microfiber. Polymeric methylene diphenyl diisocyanate was used as polyisocyanate, and cellulose microfiber having a length of 50 to 70 μm was used.

Comparative Example 4

A composition for preparing polyurethane according to Comparative Example 4 includes 100 g of the polyol, 2.5 g of the surfactant, 0.45 g of the blowing catalyst, 2.10 g of the gelling catalyst, 0.7 g of the trimerization catalyst, 1.90 g of water, 16.5 g of cyclopentane, and 149.0 g of polyisocyanate. Polymeric methylene diphenyl diisocyanate was used as polyisocyanate, and cellulose nanofiber was not used.

Comparative Example 5

A composition for preparing polyurethane according to Comparative Example 5 includes 100 g of the polyol, 2.5 g of the surfactant, 0.45 g of the blowing catalyst, 2.10 g of the gelling catalyst, 0.7 g of the trimerization catalyst, 1.90 g of water, 16.5 g of cyclopentane, 149.0 g of polyisocyanate, and 3.00 g of cellulose nanofiber. Polymeric methylene diphenyl diisocyanate was used as polyisocyanate, and cellulose microfiber having a length of 500 to 1000 nm was used.

Comparative Example 6

A composition for preparing polyurethane according to Comparative Example 6 includes 100 g of the polyol, 2.5 g of the surfactant, 0.45 g of the blowing catalyst, 2.10 g of the gelling catalyst, 0.7 g of the trimerization catalyst, 1.90 g of water, 16.5 g of cyclopentane, and 149.0 g of polyisocyanate. Polymeric methylene diphenyl diisocyanate was used as polyisocyanate, and cellulose microfiber was not used.

Comparative Example 7

A composition for preparing polyurethane according to Comparative Example 7 includes 100 g of the polyol, 2.5 g of the surfactant, 0.45 g of the blowing catalyst, 2.10 g of the gelling catalyst, 0.7 g of the trimerization catalyst, 1.90 g of water, 16.5 g of cyclopentane, 149.0 g of polyisocyanate, and 0.82 g of cellulose microfiber. Polymeric methylene diphenyl diisocyanate was used as polyisocyanate, and cellulose microfiber having a length of 200 to 500 μm was used.

Comparative Example 8

A composition for preparing polyurethane according to Comparative Example 7 includes 100 g of the polyol, 2.5 g of the surfactant, 0.45 g of the blowing catalyst, 2.10 g of the gelling catalyst, 0.7 g of the trimerization catalyst, 1.90 g of water, 16.5 g of cyclopentane, 149.0 g of polyisocyanate, and 0.82 g of cellulose microfiber. Polymeric methylene diphenyl diisocyanate was used as polyisocyanate, and cellulose microfiber having a length of 500 to 1000 μm was used.

Comparative Example 9

A composition for preparing polyurethane according to Comparative Example 9 includes 100 g of the polyol, 2.5 g of the surfactant, 0.45 g of the blowing catalyst, 2.10 g of the gelling catalyst, 0.7 g of the trimerization catalyst, 1.90 g of water, 16.5 g of cyclopentane, and 149.0 g of polyisocyanate. Polymeric methylene diphenyl diisocyanate was used as polyisocyanate, and cellulose nanofiber was not used.

Amounts of the ingredients included in the compositions for preparing polyurethane according to Examples 1 to 14 and Comparative Examples 1 to 9 and characteristics thereof are shown in Tables 1 to 4.

Table 1 shows composition ratios of Examples 1 to 3 and Comparative Examples 1 to 3, states of the polyurethane foams in accordance with the amount of cellulose microfiber, reactivity between the polyol system and isocyanate, free rise density of urethane, and thermal conductivity and compressive strength of the polyurethane foams.

TABLE 1

|  |  | Example 1 | Example 2 | Example 3 | Comparative Example 1 | Comparative Example 2 | Comparative Example 3 |
|---|---|---|---|---|---|---|---|
| polyol system | polyol (g) | 100 | 100 | 100 | 100 | 100 | 100 |
|  | surfactant (g) | 2.5 | 2.5 | 2.5 | 2.5 | 2.5 | 2.5 |
|  | blowing catalyst (g) | 0.45 | 0.45 | 0.45 | 0.45 | 0.45 | 0.45 |
|  | gelling catalyst (g) | 2.10 | 2.10 | 2.10 | 2.10 | 2.10 | 2.10 |
|  | trimerization catalyst (g) | 0.7 | 0.7 | 0.7 | 0.7 | 0.7 | 0.7 |

TABLE 1-continued

|  | Example 1 | Example 2 | Example 3 | Comparative Example 1 | Comparative Example 2 | Comparative Example 3 |
|---|---|---|---|---|---|---|
| water (g) | 1.90 | 1.90 | 1.90 | 1.90 | 1.90 | 1.90 |
| cyclopentane (g) | 16.50 | 16.50 | 16.50 | 16.50 | 16.50 | 16.50 |
| cellulose microfiber (g) | 0.27 | 0.82 | 1.36 | 0.00 | 2.73 | 3.00 |
| viscosity (cps/25° C.) | 655 | 750 | 930 | 600 | 1,550 | 2,120 |
| polyisocyanate (g) | 149.0 | 149.0 | 149.0 | 149.0 | 149.0 | 149.0 |
| state of foam | Uniform | Uniform | Uniform | Uniform | Coarse | Coarse |
| Reactivity (sec) | 39.2 | 38.9 | 39.0 | 39.1 | 38.8 | 38.8 |
| free rise density (kg/m³) | 23.2 | 23.3 | 23.2 | 23.3 | 23.5 | 23.6 |
| thermal conductivity (mW/m · K) | 19.63 | 19.53 | 19.51 | 19.50 | 19.45 | 19.75 |
| compressive strength (kgf/cm²) | 2.01 | 2.06 | 2.19 | 1.99 | 1.84 | 1.88 |

Table 2 shows composition ratios of Examples 4 to 7 and Comparative Examples 4 and 5, states of the polyurethane foams in accordance with the amount of cellulose nanofiber, reactivity between the polyol system and isocyanate, free rise density of urethane, and thermal conductivity and compressive strength of the polyurethane foams.

TABLE 2

|  |  | Example 4 | Example 5 | Example 6 | Example 7 | Comparative Example 4 | Comparative Example 5 |
|---|---|---|---|---|---|---|---|
| polyol system | polyol (g) | 100 | 100 | 100 | 100 | 100 | 100 |
|  | surfactant (g) | 2.5 | 2.5 | 2.5 | 2.5 | 2.5 | 2.5 |
|  | blowing catalyst (g) | 0.45 | 0.45 | 0.45 | 0.45 | 0.45 | 0.45 |
|  | gelling catalyst (g) | 2.10 | 2.10 | 2.10 | 2.10 | 2.10 | 2.10 |
|  | trimerization catalyst (g) | 0.7 | 0.7 | 0.7 | 0.7 | 0.7 | 0.7 |
|  | water (g) | 1.90 | 1.90 | 1.90 | 1.90 | 1.90 | 1.90 |
|  | cyclopentane (g) | 16.50 | 16.50 | 16.50 | 16.50 | 16.50 | 16.50 |
|  | cellulose nanofiber (g) | 0.27 | 0.82 | 1.36 | 2.73 | 0.00 | 3.00 |
|  | Viscosity (cps/25° C.) | 720 | 950 | 1650 | 2450 | 600 | 3120 |
|  | polyisocyanate (g) | 149.0 | 149.0 | 149.0 | 149.0 | 149.0 | 149.0 |
|  | state of foam | Uniform | Uniform | Uniform | Uniform | Uniform | Coarse |
|  | reactivity (sec) | 39.0 | 39.0 | 38.6 | 38.5 | 39.1 | 38.5 |
| free rise density (kg/m3) | | 23.3 | 23.3 | 23.0 | 22.9 | 23.3 | 23.4 |
| thermal conductivity (mW/m · K) | | 19.46 | 19.51 | 19.42 | 19.36 | 19.50 | 19.62 |
| compressive strength (kgf/cm2) | | 2.08 | 2.18 | 2.37 | 2.61 | 1.99 | 2.05 |

Table 3 shows composition ratios of Examples 8 to 10 and Comparative Examples 6 to 8, states of the polyurethane foams in accordance with the length of cellulose microfiber, reactivity between the polyol system and isocyanate, free rise density of urethane, and thermal conductivity and compressive strength of the polyurethane foams.

TABLE 3

|  |  | Example 8 | Example 9 | Example 10 | Comparative Example 6 | Comparative Example 7 | Comparative Example 8 |
|---|---|---|---|---|---|---|---|
| length of cellulose microfiber (μm) | | 10-20 | 30-70 | 100-150 | — | 200-500 | 500-1000 |
| polyol system | polyol (g) | 100 | 100 | 100 | 100 | 100 | 100 |
|  | surfactant (g) | 2.5 | 2.5 | 2.5 | 2.5 | 2.5 | 2.5 |
|  | blowing catalyst (g) | 0.45 | 0.45 | 0.45 | 0.45 | 0.45 | 0.45 |

TABLE 3-continued

|  | Example 8 | Example 9 | Example 10 | Comparative Example 6 | Comparative Example 7 | Comparative Example 8 |
|---|---|---|---|---|---|---|
| gelling catalyst (g) | 2.10 | 2.10 | 2.10 | 2.10 | 2.10 | 2.10 |
| trimerization catalyst (g) | 0.7 | 0.7 | 0.7 | 0.7 | 0.7 | 0.7 |
| water (g) | 1.90 | 1.90 | 1.90 | 1.90 | 1.90 | 1.90 |
| cyclopentane (g) | 16.50 | 16.50 | 16.50 | 16.50 | 16.50 | 16.50 |
| cellulose microfiber (g) | 0.82 | 0.82 | 0.82 | 0.00 | 0.82 | 0.82 |
| polyisocyanate (g) | 149.0 | 149.0 | 149.0 | 149.0 | 149.0 | 149.0 |
| State of foam | Uniform | Uniform | Uniform | Uniform | Coarse | Coarse |
| reactivity (sec) | 38.5 | 38.9 | 38.9 | 39.1 | 39.4 | 39.6 |
| free rise density (kg/m3) | 23.2 | 23.2 | 23.3 | 23.3 | 23.5 | 23.6 |
| thermal conductivity (mW/m · K) | 19.48 | 19.55 | 19.53 | 19.50 | 19.58 | 19.61 |
| compressive strength (kgf/cm2) | 2.06 | 2.03 | 2.06 | 1.99 | 1.84 | 1.88 |
| polyol tank filter | favorable | favorable | favorable | favorable | clogged | clogged |

Table 4 shows composition ratios of Examples 11 to 14 and Comparative Example 9, states of the polyurethane foams in accordance with the length of cellulose nanofiber, reactivity between the polyol system and isocyanate, free rise density of urethane, and thermal conductivity and compressive strength of the polyurethane foams.

TABLE 4

|  |  | Example 11 | Example 12 | Example 13 | Example 14 | Comparative Example 9 |
|---|---|---|---|---|---|---|
| length of cellulose nanofiber (nm) | | 100-200 | 200-500 | 500-1,000 | 1,000-3,000 | — |
| polyol system | polyol (g) | 100 | 100 | 100 | 100 | 100 |
|  | surfactant (g) | 2.5 | 2.5 | 2.5 | 2.5 | 2.5 |
|  | blowing catalyst (g) | 0.45 | 0.45 | 0.45 | 0.45 | 0.45 |
|  | gelling catalyst (g) | 2.10 | 2.10 | 2.10 | 2.10 | 2.10 |
|  | trimerization catalyst (g) | 0.7 | 0.7 | 0.7 | 0.7 | 0.7 |
|  | water (g) | 1.90 | 1.90 | 1.90 | 1.90 | 1.90 |
|  | cyclopentane (g) | 16.50 | 16.50 | 16.50 | 16.50 | 16.50 |
|  | cellulose nanofiber (g) | 0.82 | 0.82 | 0.82 | 0.82 | 0.00 |
| polyisocyanate (g) | | 149.0 | 149.0 | 149.0 | 149.0 | 149.0 |
| state of foam | | Uniform | Uniform | Uniform | Uniform | Uniform |
| reactivity (sec) | | 38.2 | 38.5 | 39.0 | 39.1 | 39.1 |
| free rise density (kg/m3) | | 23.1 | 23.1 | 23.3 | 23.4 | 23.3 |
| thermal conductivity (mW/m · K) | | 19.54 | 19.61 | 19.51 | 19.76 | 19.50 |
| compressive strength (kgf/cm2) | | 2.11 | 2.08 | 2.18 | 2.02 | 1.99 |

Based on results of the experiments, the following conclusions are obtained.

First, referring to Example 3 of Table 1, it is confirmed that the state of foam is uniform when the amount of the cellulose microfiber is about 0.49 parts by weight based on the total weight of the composition. Meanwhile, referring to Comparative Example 2, it is confirmed that the state of foam is not uniform when the amount of the cellulose microfiber is about 0.98 parts by weight based on the total weight of the composition. Referring to Comparative Example 1, although the state of foam not including cellulose microfiber is uniform, the foam according to Comparative Example 1 has a relatively lower compressive strength than those including cellulose microfiber according to Examples 1 to 3. As a result, it is confirmed that an appropriate amount of cellulose microfiber may be in the range of about 0.01 to 0.5 parts by weight, relative to the total weight of the composition.

Then, referring to Example 7 of Table 2, it is confirmed that the state of foam is uniform when the amount of the cellulose nanofiber is about 0.98 parts by weight based on the total weight of the composition. Meanwhile, referring to Comparative Example 5, it is confirmed that the state of foam is not uniform when the amount of the cellulose nanofiber is about 1.08 parts by weight based on the total weight of the composition. Referring to Comparative Example 4, although the state of foam not including cellulose nanofiber is uniform, the foam according to Comparative Example 4 has a relatively lower compressive strength than those including cellulose nanofiber according to Examples 4 to 6. As a result, it is confirmed that an appropriate amount of cellulose nanofiber may be in the range of about 0.01 to 0.1 parts by weight, relative to the total weight of the composition.

Then, referring to Examples 8 to 10 of Table 3, it is confirmed that the state of foam is uniform when the length of the cellulose microfiber is in the range of 10 to 150 μm. Meanwhile, referring to Comparative Examples 7 and 8, when the length of the cellulose microfiber is in the range of 200 to 1000 μm, the state of foam is not uniform and the filter of the polyol tank is clogged. In addition, although the state of foam not including the cellulose microfiber is uniform, the foam has a relatively lower compressive strength than those including cellulose microfiber. As a result, it is confirmed that an appropriate length of the cellulose microfiber is about 150 μm or less.

Then, referring to Examples 11 to 14 of Table 4, the state of foam is uniform when the length of the cellulose nanofiber is in the range of 100 to 3000 nm. Meanwhile, referring to Comparative Example 9, although the state of foam not including the cellulose nanofiber is uniform, the foam has a relatively lower compressive strength than those including cellulose nanofiber. As a result, it is confirmed that an appropriate length of the cellulose nanofiber is about 3000 nm or less.

Hereinafter, the results of the experiments of Tables 1 to 4 will be described with reference to the accompanying drawings.

Figure 10:
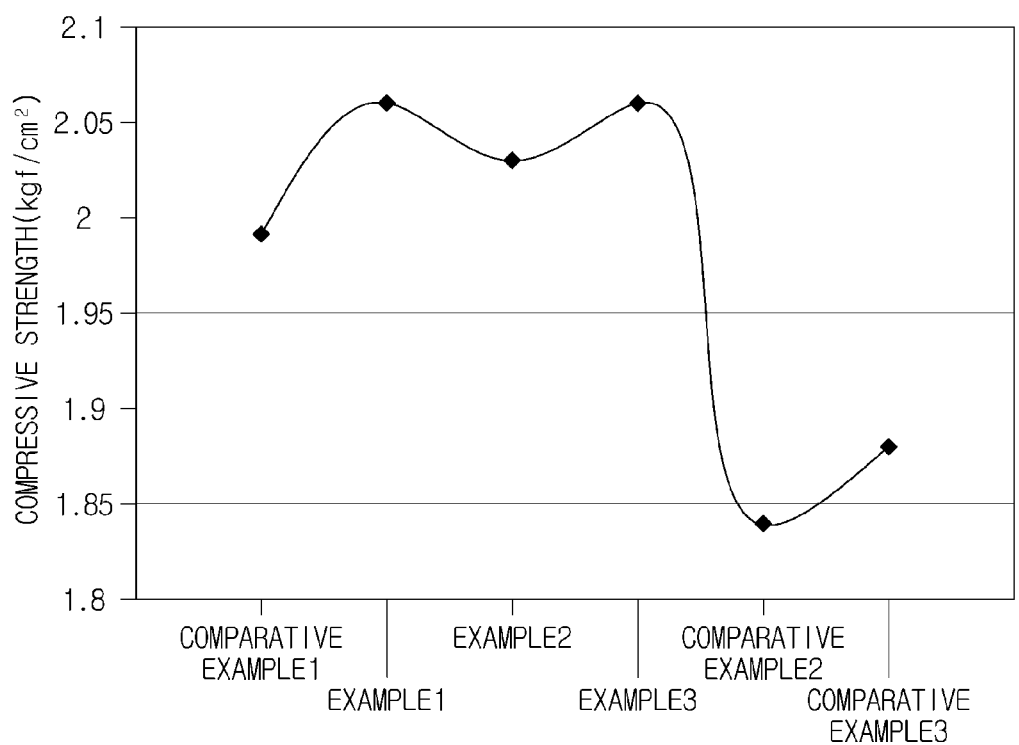
FIG. 10 is a graph illustrating compressive strength of the polyurethane foam 250 with respect to the amount of the cellulose microfiber.

FIG. 10 is a graph illustrating compressive strength of the polyurethane foam 250 with respect to the amount of the cellulose microfiber.

Referring to FIG. 10, the foams prepared according to Examples 1 to 3 have relatively high compressive strengths of 2 kgf/cm$^2$ or greater.

That is, it is confirmed that the foams according to Examples 1 to 3 have higher compressive strength than that of the foam prepared according to Comparative Example 1 to which cellulose microfiber is not added.

Meanwhile, the foams prepared according to Comparative Examples 2 and 3 have compressive strengths of 1.84 kgf/cm$^2$ and 1.88 kgf/cm$^2$, respectively.

As a result, it is confirmed that compressive strength increases when the cellulose microfiber is added thereto. However, compressive strength may decrease by an excess of the cellulose microfiber.

Figure 11:
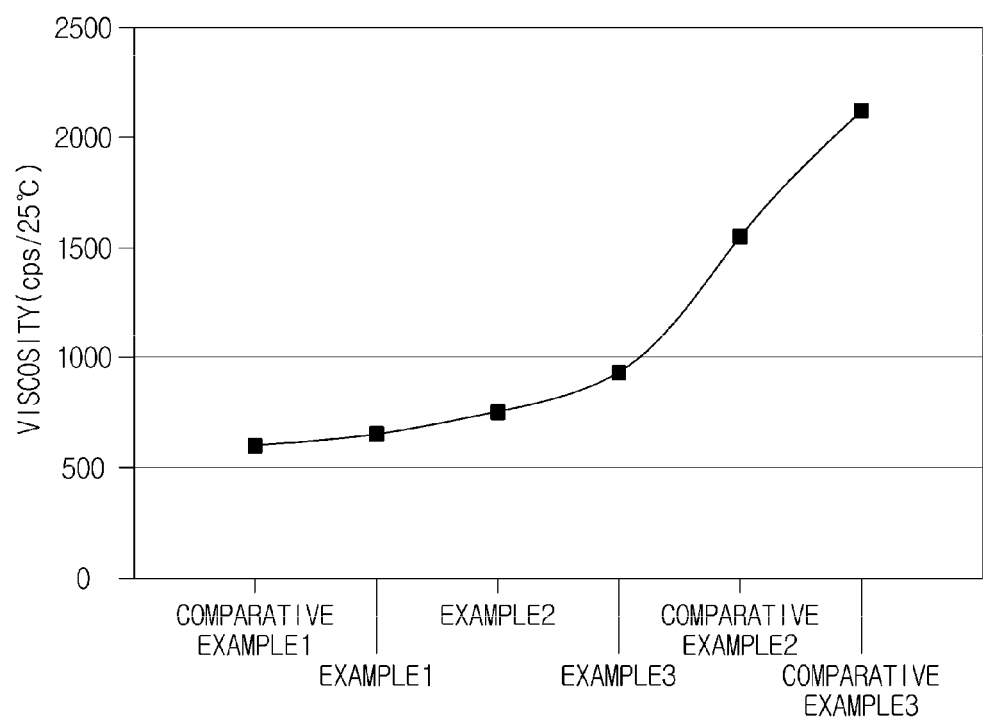
FIG. 11 is a graph illustrating viscosity of the polyol system with respect to the amount of the cellulose microfiber.

FIG. 11 is a graph illustrating viscosity of the polyol system with respect to the amount of the cellulose microfiber.

Referring to FIG. 11, it is confirmed that viscosity of the polyol system increases as the amount of the cellulose microfiber increases. Particularly, the amounts of the cellulose microfiber of the foams according to Comparative Examples 2 and 3 are 0.99 parts by weight and 1.08 parts by weight based on the total weight of the composition, respectively. It is confirmed that the state of foam is not uniform when the polyurethane foam 250 is formed of the compositions including the polyol systems according to Comparative Examples 2 and 3.

Figure 12:
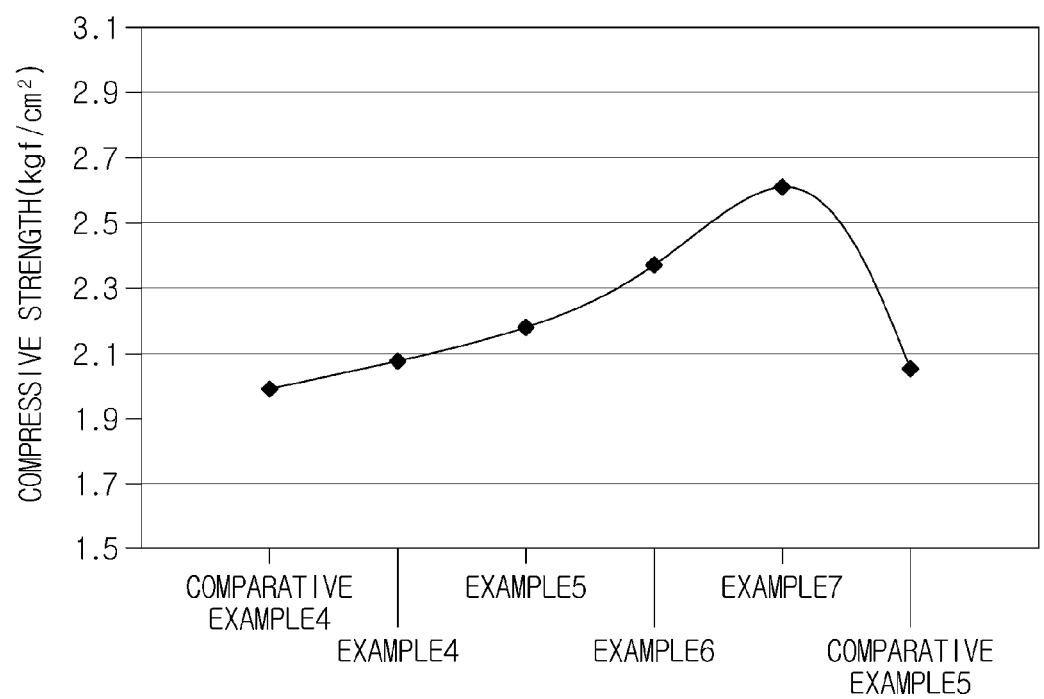
FIG. 12 is a graph illustrating compressive strength of the polyurethane foam 250 with respect to the amount of the cellulose nanofiber.

FIG. 12 is a graph illustrating compressive strength of the polyurethane foam 250 with respect to the amount of the cellulose nanofiber.

Referring to FIG. 12, the foams prepared according to Examples 4 to 7 have relatively high compressive strengths of 2 kgf/cm$^2$ or greater.

That is, it is confirmed that the foams according to Examples 4 to 7 have higher compressive strengths than that of the foam prepared according to Comparative Example 4 to which the cellulose nanofiber is not added.

Meanwhile, the foam prepared according to Comparative Example 5 has a compressive strength of 2.05 lower than that prepared according to Example 7, but greater than that of the foam according to Comparative Example 4 to which the cellulose nanofiber is not added.

As a result, it is confirmed that compressive strength increases when the the cellulose nanofiber is added thereto. However, compressive strength may decrease by an excess of the cellulose nanofiber.

Figure 13:
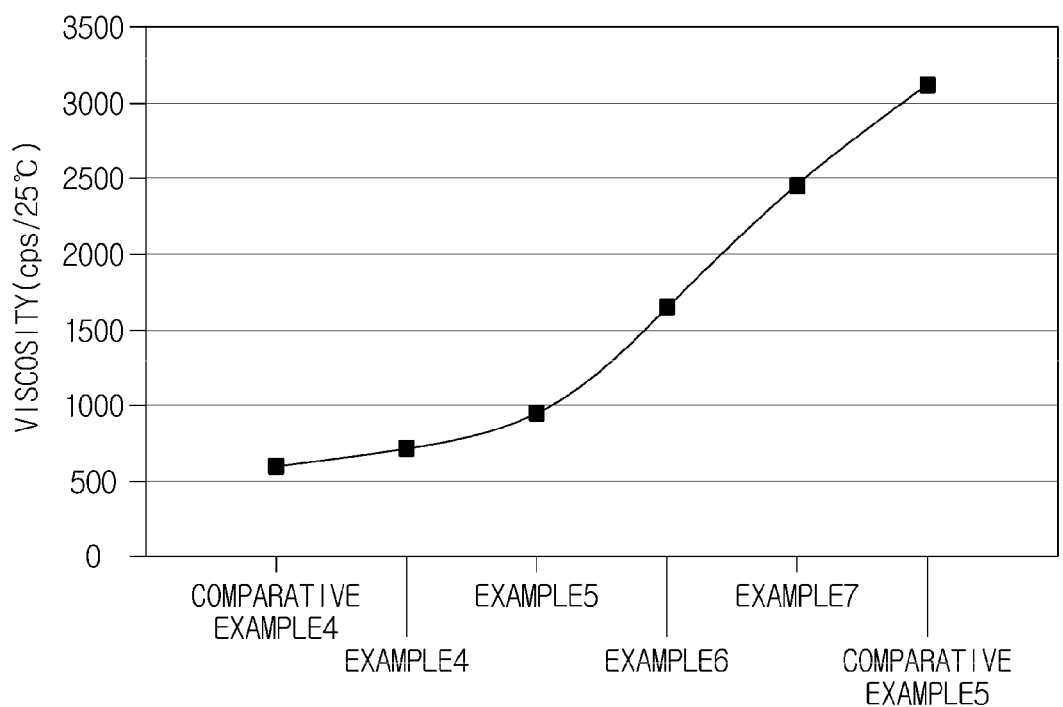
FIG. 13 is a graph illustrating viscosity of the polyol system with respect to the amount of the cellulose nanofiber.

FIG. 13 is a graph illustrating viscosity of the polyol system with respect to the amount of the cellulose nanofiber.

Referring to FIG. 13, it is confirmed that viscosity of the polyol system increases as the amount of the cellulose nanofiber increases. Particularly, the amount of the cellulose nanofiber of the foam according to Comparative Example 5 is 1.08 parts by weight based on the total weight of the composition. It is confirmed that viscosity of the polyol system rapidly increases if the amount of the cellulose nanofiber is greater than about 1 part by weight based on the total weight of the composition. Also, it is confirmed that the state of foam is not uniform when the polyurethane foam 250 is formed of the composition including the polyol system according to Comparative Example 5.

Figure 14:
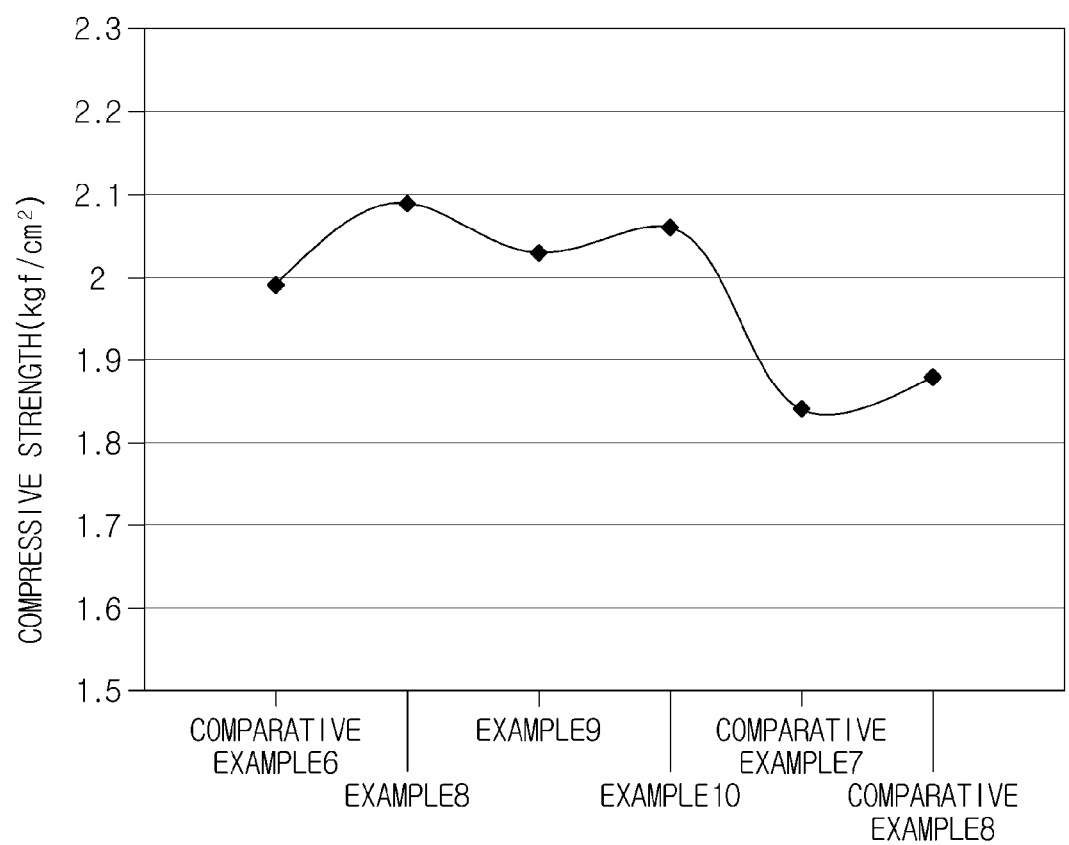
FIG. 14 is a graph illustrating compressive strength of the polyurethane foam 250 with respect to the length of the cellulose microfiber.

FIG. 14 is a graph illustrating compressive strength of the polyurethane foam 250 with respect to the length of the cellulose microfiber.

Referring to FIG. 14, the foams prepared according to Examples 8 to 10 have relatively high compressive strengths of 2 kgf/cm$^2$ or greater.

That is, it is confirmed that the foam has relatively high compressive strength if the length of the cellulose microfiber is about 150 or less.

Meanwhile, the foams according to Comparative Examples 7 and 8 have compressive strengths of 1.84 and 1.88 kgf/cm$^2$, respectively.

As a result, it is confirmed that compressive strength increases as the length of the cellulose microfiber increases. However, compressive strength may decrease if the cellulose microfiber is too long.

Figure 15:
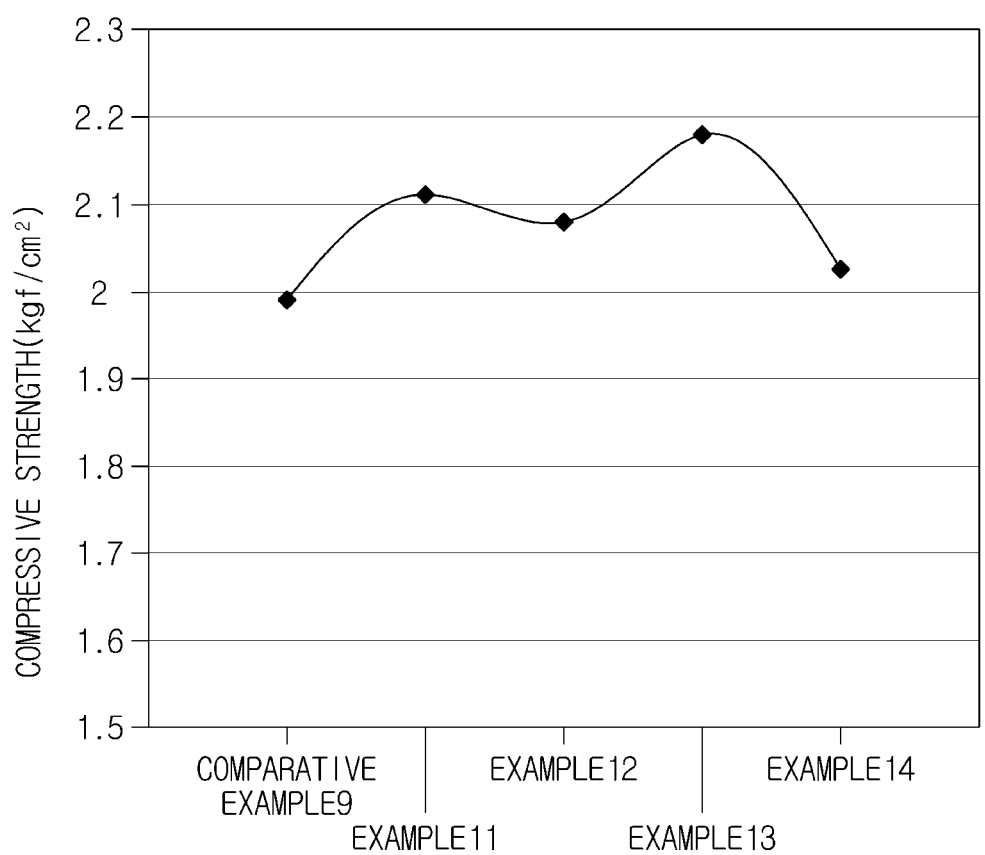
FIG. 15 is a graph illustrating compressive strength of the polyurethane foam 250 with respect to the length of the cellulose nanofiber.

FIG. 15 is a graph illustrating compressive strength of the polyurethane foam 250 with respect to the length of the cellulose nanofiber.

Referring to FIG. 15, it is confirmed that the foams prepared according to Examples 11 to 14 have relatively high compressive strengths of 2 kgf/cm$^2$ or greater. Particularly, it is confirmed that compressive strength of the foam increases as the length of the cellulose nanofiber increases. However, it is confirmed the compressive strength of the foam including the cellulose nanofiber having the greatest length prepared according to Example 4 is slightly less than that of the foam prepared according to Example 3.

As is apparent from the above description, the polyurethane foam according to an embodiment in which fibers are uniformly dispersed may have rigidity and be used as a thermal insulation of a refrigerator. Due to rigidity of the polyurethane foam, distortion such as shrinkage or warpage of the cabinet or doors of the refrigerator may be reduced, and thus an amount of urethane may be reduced.

According to an embodiment, a structure reinforcing agent used to increase strength of urethane foam may be reduced or removed.

Although a few embodiments of the polyurethane foam 250, the refrigerator including the same, and the method of manufacturing the polyurethane foam 250 according to embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A refrigerator comprising a polyurethane foam formed of a composition for preparing polyurethane, the refrigerator comprising:
    a cabinet;
    a door configured to open and close the cabinet; and
    a thermal insulation disposed in at least one of the cabinet and the door,
    wherein the thermal insulation comprises:
    a polyurethane foam-forming polyol system comprising a fiber having hydroxyl groups; and
    isocyanate, wherein
    the fiber having hydroxyl groups has a diameter of 10 nm to 20 nm and an aspect ratio of 5 to 150 or the fiber having hydroxyl groups has a diameter of 1 μm to 5 μm and an aspect ratio of 2 to 150.

2. The refrigerator according to claim 1, wherein the fiber having hydroxyl groups comprises at least one selected from the group consisting of cellulose fiber, linen fiber, flax fiber, polyvinyl alcohol fiber, and carbon fiber treated with hydroxyl groups.

3. The refrigerator according to claim 1, wherein the polyurethane foam has a total density of 28 to 50 kg/m³ and a central density of 25 to 45 kg/m³.

4. The refrigerator according to claim 1, wherein the fiber having hydroxyl groups comprises at least one of nanofiber and microfiber.

5. The refrigerator according to claim 1, wherein
    the fiber having hydroxyl groups comprises nanofiber, and
    an amount of the nanofiber is in the range of 0.01 to 1 parts by weight based on a total weight of the composition.

6. The refrigerator according to claim 1, wherein
    the fiber having hydroxyl groups comprises microfiber, and
    an amount of the microfiber is in the range of 0.01 to 0.5 parts by weight based on the total weight of the composition.

7. The refrigerator according to claim 1, wherein the polyol system comprises a polyol, the fiber having hydroxyl groups, a blowing agent, and an additive.

8. A polyurethane foam formed of a composition for preparing polyurethane comprising:
    a polyurethane foam-forming polyol system comprising a fiber having hydroxyl groups; and
    isocyanate, wherein
    the fiber having hydroxyl groups has a diameter of 10 nm to 20 nm and an aspect ratio of 5 to 150 or the fiber having hydroxyl groups has a diameter of 1 μm to 5 μm and an aspect ratio of 2 to 150.

9. The polyurethane foam according to claim 8, wherein the fiber having hydroxyl groups comprises at least one selected from the group consisting of cellulose fiber, linen fiber, flax fiber, polyvinyl alcohol fiber, and carbon fiber treated with hydroxyl groups.

10. The polyurethane foam according to claim 8, wherein the polyurethane foam has a total density of 28 to 50 kg/m³ and a central density of 25 to 45 kg/m³.

11. The polyurethane foam according to claim 8, wherein the fiber having hydroxyl groups comprises at least one of nanofiber and microfiber.

12. The polyurethane foam according to claim 8, wherein
    the fiber having hydroxyl groups comprises nanofiber, and
    an amount of the nanofiber is in the range of 0.01 to 1 parts by weight based on a total weight of the composition.

13. The polyurethane foam according to claim 8, wherein
    the fiber having hydroxyl groups comprises microfiber, and
    an amount of the microfiber is in the range of 0.01 to 0.5 parts by weight based on the total weight of the composition.

14. The polyurethane foam according to claim 8, wherein the polyol system comprises a polyol, the fiber having hydroxyl groups, a blowing agent, and an additive.

* * * * *